US008734555B2

(12) United States Patent
Jarrier

(10) Patent No.: US 8,734,555 B2
(45) Date of Patent: May 27, 2014

(54) DEVICE FOR FILTERING FLUID IN A POWER GENERATING SYSTEM

(75) Inventor: Etienne Rene Jarrier, Basingstoke (GB)

(73) Assignee: BHA Altair, LLC, Franklin, TN (US)

( * ) Notice: Subject to any disclaimer, the term of this patent is extended or adjusted under 35 U.S.C. 154(b) by 0 days.

(21) Appl. No.: 13/494,727

(22) Filed: Jun. 12, 2012

(65) Prior Publication Data

US 2013/0327003 A1 Dec. 12, 2013

(51) Int. Cl.
*B01D 46/00* (2006.01)

(52) U.S. Cl.
USPC ................ 55/385.1; 55/467; 55/482; 55/484; 55/492; 55/498; 55/502; 55/504; 55/505

(58) Field of Classification Search
USPC ........ 55/341.1, 482, 484, 492, 493, 498, 502, 55/505, 508, 510, 321; 95/286, 287; 210/445, 448, 452, 497.01
See application file for complete search history.

(56) References Cited

U.S. PATENT DOCUMENTS

| | | | | |
|---|---|---|---|---|
| 5,207,811 | A * | 5/1993 | Buonpastore | 55/498 |
| 5,238,474 | A | 8/1993 | Kahlbaugh et al. | |
| 6,203,591 | B1 * | 3/2001 | Clements et al. | 55/341.1 |
| 6,875,256 | B2 | 4/2005 | Gillingham et al. | |
| 7,670,403 | B2 * | 3/2010 | Modesto et al. | 55/502 |
| 7,967,898 | B2 | 6/2011 | Sporre et al. | |
| 8,070,848 | B2 * | 12/2011 | Cosgrove | 55/502 |
| 8,241,381 | B2 * | 8/2012 | Braunecker et al. | 55/483 |
| 8,268,032 | B2 * | 9/2012 | Eyers et al. | 55/502 |
| 8,518,139 | B2 * | 8/2013 | Jessberger et al. | 55/495 |
| 2001/0020419 | A1 * | 9/2001 | Engel et al. | 96/189 |
| 2005/0133433 | A1 | 6/2005 | Rampen | |
| 2010/0071323 | A1 * | 3/2010 | Cosgrove | 55/357 |
| 2010/0192777 | A1 * | 8/2010 | Walz et al. | 96/419 |
| 2011/0048228 | A1 | 3/2011 | Handley et al. | |
| 2011/0048236 | A1 | 3/2011 | Lamee | |
| 2011/0315015 | A1 | 12/2011 | Jarrier et al. | |
| 2012/0192537 | A1 * | 8/2012 | Coulonvaux et al. | 55/502 |

FOREIGN PATENT DOCUMENTS

| | | | |
|---|---|---|---|
| EP | 2392554 | A1 | 12/2011 |
| WO | 99/42719 | A2 | 8/1999 |
| WO | WO-2004039475 | | 5/2004 |

* cited by examiner

*Primary Examiner* — Duane Smith
*Assistant Examiner* — Minh-Chau Pham
(74) *Attorney, Agent, or Firm* — Reinhart Boerner Van Deuren P.C.

(57) ABSTRACT

This disclosure describes examples of a seal element that can prevent leaks that occur due to sagging and/or displacement of a filter device from the tubesheet in a power generating system. The seal element can have a non-uniform profile that defines a material thickness for the seal element. In one example, the non-uniform profile defines an area or section of the seal element that is thicker relative to other areas or sections of the seal element. The thicker area corresponds to certain positions on the filter device that are susceptible to movement that can occur, e.g., due to particulate build-up during operation of the turbo-machine.

20 Claims, 4 Drawing Sheets

DEVICE FOR FILTERING FLUID IN A POWER GENERATING SYSTEM

BACKGROUND OF THE INVENTION

The subject matter disclosed herein relates to turbo-machines (e.g., gas and/or steam turbines) and, in particular, to filter devices that remove particulates from fluids flowing into the turbo-machine.

Power generating systems may use turbo-machines to drive a generator. During normal operation, the turbo-machines draw in air for combustion. The air passes through a compressor before a combustor mixes the air with fuel and ignites the mixture to drive a turbine.

Contaminants (e.g., dirt, dust, and salt) in the air can reduce performance and efficiency of the turbo-machine. These contaminants can corrode the surface of the compressor blades. The resulting surface roughness decreases air flow and efficiency and, ultimately, reduces both the output of the turbo-machine and the efficiency of the power generating system overall.

Filtration systems remove particulates from the air to prevent damage the contaminants can cause to the turbo-machine. Examples of these filtration systems may feature a filter device upstream of the compressor. The filter device comprises a filter media to capture particulates before the particulates can reach the combustor. Conventional filter devices often have an elongated body, which secures to a wall, or "tubesheet," found in the filtration system. A seal is disposed between the tubesheet and wall. This seal prevents unfiltered air from bypassing the filter cartridge, which can permit contaminants to pass through the tubesheet with air that transits the power generating system and to the turbo-machine.

During long periods of operation, particulates may saturate the filter media, which results in a condition that impedes the flow of air and can exacerbate pressure drop across the filter media. The excess particulates may also increase the weight of the filter device. In some cases, the additional weight on the elongated body can cause the filter device to sag, thereby pulling the seal away from the tubesheet and allowing air to flow between the tubesheet and the seal.

The discussion above is merely provided for general background information and is not intended to be used as an aid in determining the scope of the claimed subject matter.

BRIEF DESCRIPTION OF THE INVENTION

This disclosure describes examples of a filter device with a seal element that can prevent leaks that occur due to sagging and/or displacement of a filter device from the tubesheet in a power generating system. The seal element can have a non-uniform profile that defines a material thickness for the seal element. In one example, the non-uniform profile defines an area or section of the seal element that is thicker relative to other areas or sections of the seal element. The thicker area corresponds to certain positions on the filter device that are susceptible to movement that can occur, e.g., due to particulate build-up during operation of the turbo-machine.

This disclosure describes, in one embodiment, a filter device that comprises an elongated body comprising a filter media and a seal element disposed on a first end of the elongated body. The seal element has a non-uniform profile that defines a material thickness for the seal element. The material thickness can comprise a first material thickness in a first section of the seal element and a second material thickness in a second section of the seal element, wherein the first material thickness is greater than the second material thickness.

This disclosure also describes, in one embodiment, a filter device that comprises a first filter element having a first end and a second end, a second filter element abutting the second end of the first filter element, and a seal element disposed on the first end of the first filter element. The seal element has a first material thickness in a first section and a second material thickness in a second section, wherein the first material thickness is greater than the second material thickness.

This disclosure further describes, in one embodiment, a power generating system that comprises an air filter unit with a tubesheet, a filter device secured to the tubesheet, and a seal element disposed between the filter device and the tubesheet. The seal element has a first material thickness in a first section of the seal element and a second material thickness in a second section of the seal element, wherein the first material thickness is greater than the second material thickness.

This brief description of the invention is intended only to provide a brief overview of the subject matter disclosed herein according to one or more illustrative embodiments, and does not serve as a guide to interpreting the claims or to define or limit the scope of the invention, which is defined only by the appended claims. This brief description is provided to introduce an illustrative selection of concepts in a simplified form that are further described below in the detailed description. This brief description is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

So that the manner in which the features of the invention can be understood, a detailed description of the invention may be had by reference to certain embodiments, some of which are illustrated in the accompanying drawings. It is to be noted, however, that the drawings illustrate only certain embodiments of this invention and are therefore not to be considered limiting of its scope, for the scope of the invention encompasses other equally effective embodiments. The drawings are not necessarily to scale, emphasis generally being placed upon illustrating the features of certain embodiments of the invention. In the drawings, like numerals are used to indicate like parts throughout the various views. Thus, for further understanding of the invention, reference can be made to the following detailed description, read in connection with the drawings in which.

DETAILED DESCRIPTION OF THE INVENTION

Broadly, this disclosure sets forth various embodiments of a filter device found in a power generating system, e.g., with a turbo-machine. Examples of the filter device include cartridge filters, which have an elongated body that anchors at one end to a wall member found in the structure of the power generating system. The other end of the elongated body remains essentially unsupported.

As discussed more below, these filter devices maintain an effective airtight seal between the elongated body and the wall member. This airtight seal prevents air from bypassing the filter device, which can introduce contaminants into the turbo-machine that are detrimental to performance and longevity of the power generating system. In one aspect, the filter device can include a seal element that forms the airtight seal at the end of the elongated body that anchors to the wall member. The seal element often resides between a face of the elongated body and the wall member.

To maintain the airtight seal during extended operation of the turbo-machine, examples of the seal element have a non-uniform profile, the design of which compensates for forces that tend to cause the filter device to disengage from the wall member. These forces include, for example, cantilever forces that result from the build-up of particulates in the filter device. This build-up increases the weight of the elongated body and, thus, increases the magnitude of the moment forces pulling on the anchored end of the filter device. Eventually, these moment forces can displace the anchored end of filter device from the wall member, often resulting in gaps between the filter device and the wall member that allow air to flow between the filter device and the wall member. Use of the seal element with the non-uniform profile, however, maintains contact between the filter device and the wall despite the natural “sag” of the filter device that can occur during operation of the turbo-machine.

Figure 1:
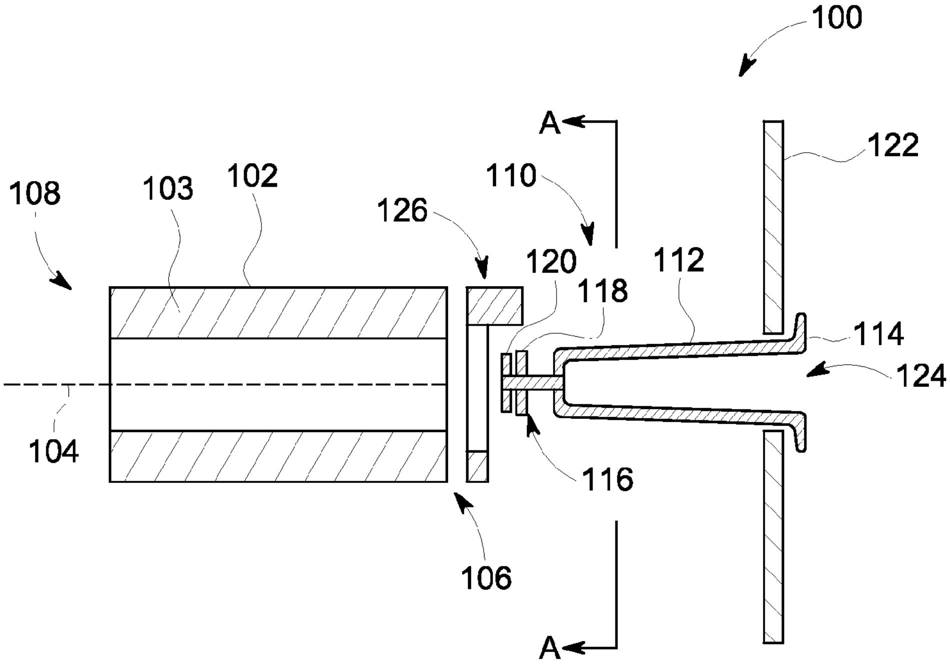
FIG. 1 depicts a schematic diagram that shows an exploded, side, cross-section view of an exemplary filter device for use in a power generating system.
Figure 2:
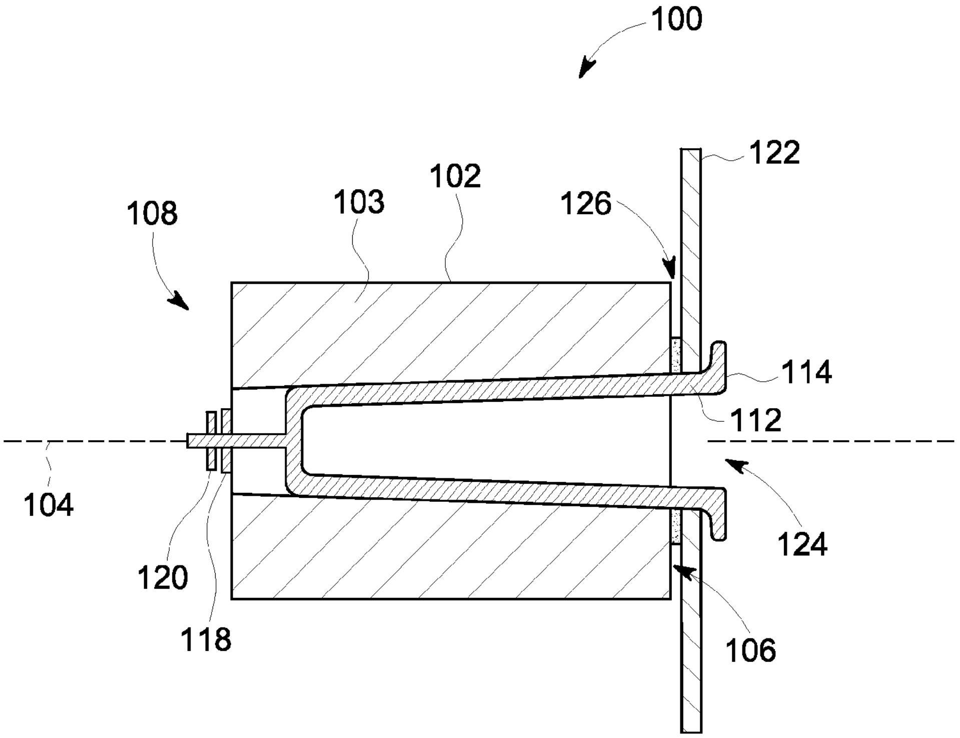
FIG. 2 depicts a schematic diagram that show an assembled, side, cross-section view of the exemplary filter device of FIG. 1 for use in a power generating system.

FIGS. 1 and 2 illustrate schematic diagrams that depict a side, cross-section view of an exemplary filter device 100 in exploded (FIG. 1.) and assembled (FIG. 2) forms. In the example of FIG. 1, the filter device 100 includes an elongated body 102 that comprises a filter media 103. The elongated body 102 has a central axis 104, a first end 106 (also “downstream end 106”), and a second end 108 (also “upstream end 108”). The filter device 100 also includes a support frame 110 with a mounting structure 112 that has one or more mounting feet 114. The support frame 110 also has a cap structure 116 with an end plate 118 and a fastening nut 120, the combination of which seals the second end 108 of the elongated body 102 as discussed more below. The mounting structure 112 secures the elongated body 102 to a wall member 122 (also “tubesheet 122”). In one example, the mounting structure 112 fits through an opening 124 in the tubesheet 122. A seal element 126, which resides between the elongated body 102 and the tubesheet 122, circumscribes the opening 124.

Examples of the seal element can comprise various compressible materials, e.g., polymer-based materials and/or other materials that are typical of gaskets and o-rings to form the air tight seal. These materials can be formed into separate elements, which secure onto the structure of the filter device 100. Construction of the filter device 100 can likewise incorporate such compressible materials. In this way, the seal element 126 can be formed as an integral and/or partially integral component of the filter device 100.

As best shown in FIG. 2, the mounting structure 112 fits inside of the elongated body 102. The end plate 118 mates with or otherwise interfaces with the second end 106 of the elongated body 102. In one implementation, the mounting feet 114 engage the downstream side of the tubesheet 122 so, as an end user tightens the fastener 120, the elongated body 102 translates along the mounting structure 112 toward the tubesheet 122. The movement of the elongated body 102 compresses the seal element 126 between the first end 108 of the elongated body 102 and the upstream side of the tubesheet 122, thereby forming an airtight seal between the elongated body 102 and the tubesheet 122.

Figure 3:
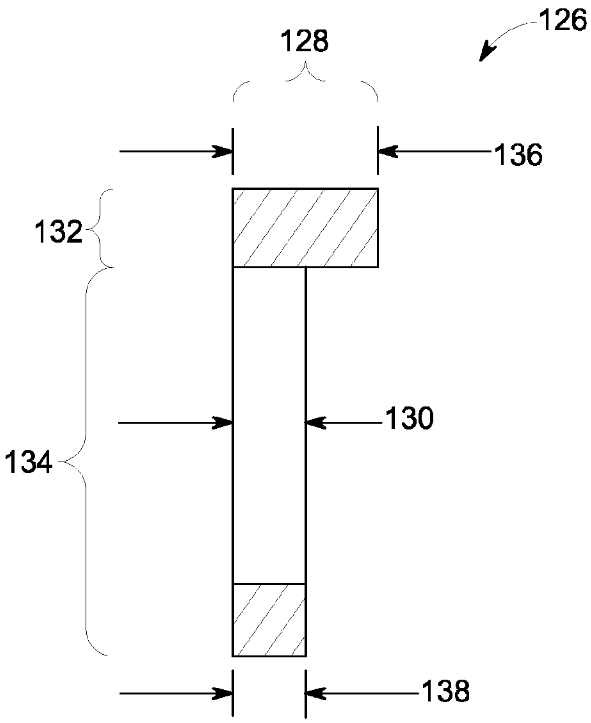
FIG. 3 depicts a detail view of an exemplary seal element for use with the exemplary filter device of FIG. 1.

FIG. 3 illustrates a detail view of the seal element 126. As shown in FIG. 3, the seal element 126 has a non-uniform profile 128 that defines features of the seal element 126. These features include, for example, values for a material thickness 130. These values can vary between at least a first section 132 and a second section 134. In one example, the material thickness 130 can have a first material thickness 136 that is larger than a second material thickness 138. In another example, the non-uniform profile 128 can define at least a third material thickness with a value between the first material thickness 136 and the second material thickness 138.

The extent of variation in the material thickness 130 (e.g., between the first material thickness 136 and the second material thickness 138) can depend on various factors determinative of where gaps and leaks may form, e.g., dimensions of the elongated body (e.g., elongated body 102 of FIG. 1), the configuration of the support frame (e.g., support frame 110 of FIG. 1), the composition of contaminants that enter the filter device 100, etc. In the present example, as shown in FIGS. 1, 2, and 3, the material thickness 130 can change abruptly between the first section 132 and the second section 134, e.g., comparing the first material thickness 136 to the second material thickness 138. In other examples, the material thickness 130 can change more gradually, e.g., wherein the material thickness 130 transitions incrementally and/or smoothly from the first material thickness 136 to the second material thickness 138 across the non-uniform profile 128.

Figure 4:
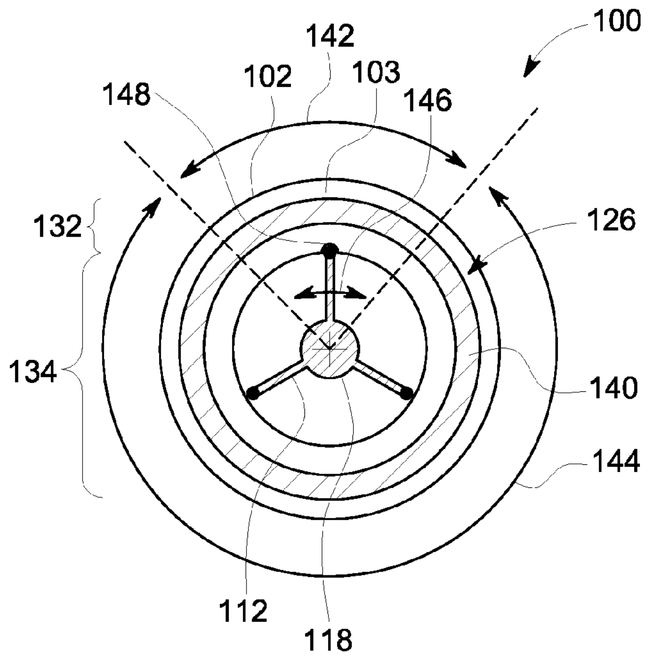
FIG. 4 depicts a front view of the exemplary filter device of FIG. 1

FIG. 4 shows a front view of the filter device 100 taken at line A-A. In one example, the seal element 126 forms an annular ring 140. The first section 132 and the second section 134 correspond to annular portions (e.g., a first annular portion 142 and a second annular portion 144) of the annular ring 140. An angle 146 defines the size of the first annular portion 142 and the second annular portion 144.

In one embodiment, the elongated body 102 also includes an orientation feature 148 to aligns the elongated body 102 with the mounting structure 112. Examples of the orientation feature 148 include grooves, detents, and notches, which can receive a portion of the mounting structure 112. These features prevent rotation of the elongated body 102 with respect to the mounting structure 112 during installation. Moreover, use of the orientation feature 148 can ensure that the elongated body 102 properly compresses the seal element 126 against the tubesheet (e.g., tubesheet 122 of FIG. 1), which prevents air from bypassing the filter media 103. In other examples, the orientation feature 148 mates with corresponding wall features found on the tubesheet (e.g., tubesheet 122 of FIG. 1). Thus, in this configuration, improper positioning of the orientation feature 148 relative to the corresponding wall features can prevent the filter device 100 from attaining proper sealing, e.g., the corresponding wall feature will interfere with the elongated body 102 to prevent the filter device 100 from being properly installed.

The material thickness (e.g., material thickness 130 of FIG. 3) of the annular ring 140 can vary according to the annular size and/or location of the first annular portion 142 and the second annular portion 144. In general, use of the seal element 126 will provide maximum benefit when the material of the annular ring 140 is thickest at the locations at which gaps are most likely to occur due to the cantilever forces. For example, if the gaps are likely to occur proximate the first annular portion 142, then the thickness of the material of the annular ring 140 can be selected to accommodate the susceptibility of filter device 100 to gaps in that area. This disclosure does, however, contemplate configurations of the annular ring 140 that has a non-uniform profile (e.g., non-uniform profile 128 of FIG. 3) that defines the thickness of the annular ring 140 to vary from one of the annular portions 142, 144 to the other as well as within the annular portions 142, 144 individually.

In connection with the present discussion, for example, the annular ring 140 can have a first material thickness (e.g., first material thickness 136 of FIG. 3) across the entirety of the first annular portion 142 and a second material thickness (e.g., second material thickness 138 of FIG. 3) across the entirety of the second annular portion 144. In other examples, the material thickness (130) can gradually change, both within the first annular portion 142 and the second annular portion 144 as well as in transition between the first annular portion 142 and the second annular portion 144. For example, the material thickness (130) of the annular ring 140 can change from an area in the first annular portion 142 that has the first material thickness (136) to an area in the second annular portion 144 that has the second material thickness (138).

Figure 5:
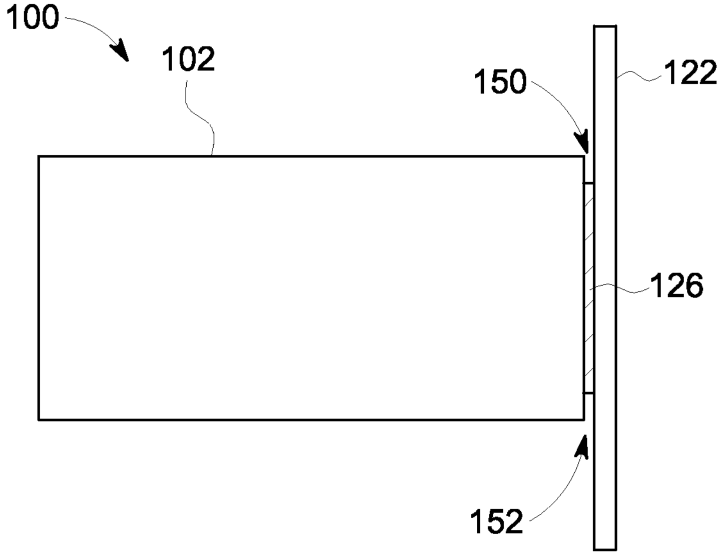
FIG. 5 depicts a side view of another exemplary filter device with a seal element in a uniformly compressed condition.
Figure 6:
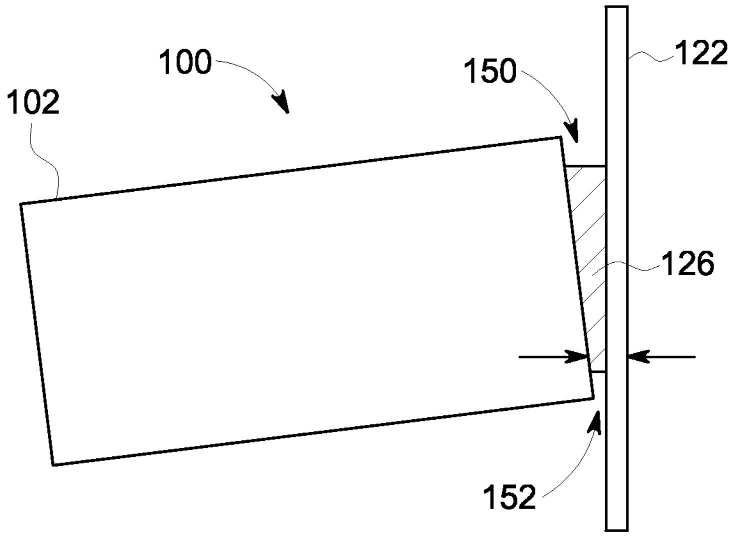
FIG. 6 depicts a side view of the exemplary filter device of FIG. 5 with the seal element in a non-uniformly compressed condition.

FIGS. 5 and 6 illustrate how examples of the seal element 126 can prevent air from bypassing the filter media (e.g., filter media 103 of FIG. 1) of the elongated body 102 and the tubesheet 122. FIG. 5 illustrates the seal element 126 in a uniformly compressed condition, which corresponds to a proper or "non-sagging" mounted configuration for the elongated body 102 on the tubesheet 122. In the non-sagging mounted configuration, the seal element 126 fills a gap (e.g., comprising a top gap 150 and a bottom gap 152) that separates the elongated body 102 from the wall member 122. The gap 150, 152 is less than the material thickness of the seal element 126, thereby compressing the seal element 126 to form an airtight seal.

In FIG. 6, the seal element 126 is in a non-uniformly compressed condition due, at least in part, to the position of the elongated body 102 in a non-proper or "sagging" mounted configuration, e.g., due to particulate build-up (or other factors). In the sagging mounted configuration, the width of top gap 150 changes as compared to the width of the top gap 150 in non-sagging mounted configuration of FIG. 5. In one example, the top gap 150 is larger than the bottom gap 152. The width of the top gap 150 changes the amount of compression of the seal element 126. However, as discussed above, the seal element 126 maintains contact with both of the elongated body 102 and the tubesheet 122 because the seal element 126 is thicker proximate the top gap 150 to accommodate for the increase in width of the top gap 150.

Figure 7:
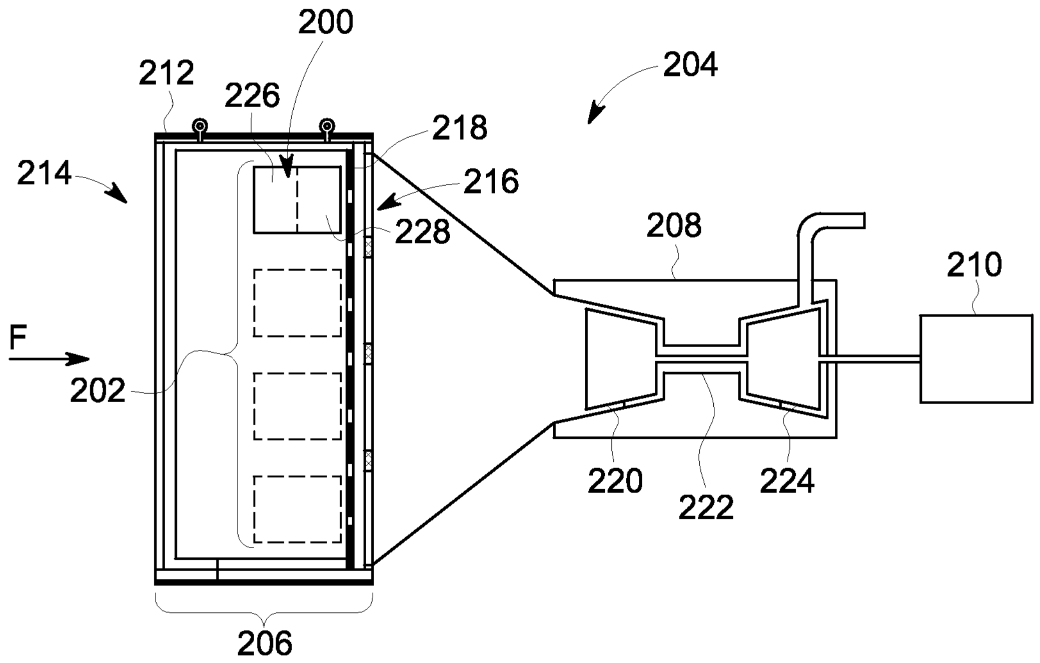
FIG. 7 depicts a schematic diagram of an exemplary filter device in a power generating system.

FIG. 7 illustrates a schematic diagram of an exemplary filter device 200, which can remove particulates from a fluid F (e.g., air). The filter device 200 is part of an array 202, which can include any number of filter devices (e.g., the filter device 200). In its present implementation, the filter device 200 is part of a power generating system 204 with an air filter unit 206, a turbo-machine 208, and a generator 210. The air filter unit 206 has a housing 212 with an inlet 214 and an outlet 216. The housing 212 encloses a wall 218 (also "tubesheet 218") that is upstream of the turbo-machine 208. Examples of the tubesheet 218 can comprise one or more metal sheets with features (e.g., holes, openings, apertures) to mount the filter device 200 and to permit fluid F to flow through the wall. In one example, as shown in FIG. 7 the filter device 200 mounts to the upstream side of the tubesheet 218 in substantial alignment with a corresponding aperture in the tubesheet 218.

The turbo-machine 208 can include a compressor 220, a combustor 222, and a turbine 224 (e.g., a gas or steam turbine). During operation, the compressor 220 draws air (e.g., fluid F) into the air filter unit 206. The air passes through the filter device 200 and the tubesheet 218 before the air enters the turbo-machine 208. The compressor 220 pressurizes the air, which is subsequently fed to the combustor 222 to mix the air with fuel and ignite the mixture to provide the driving force for the turbine 224.

Examples of the filter device 200 can have a two element filter set (e.g., a first filter element 226 and an second filter element 228). The first filter element 226 and the second filter element 228 can comprise filter media that allows the collection of particulates on its surface. Exemplary filter media includes fabric filter media, although this disclosure also contemplates materials, e.g., closed cell foams, with properties sufficient to trap particulates without causing undue pressure drop during operation of the turbo-machine. In one example, the filter media has pleats and/or folds distributed throughout the structure of the first filter element 226 and the second filter element 228 to increase the surface area available to capture and hold particulates.

Examples of the first filter element 226 and the second filter element 228 can abut one another, as shown in FIG. 6, to form the elongated body (e.g., elongated body 102 of FIGS. 1, 4, and 5) of the filter device 200. These elements can be formed together, e.g., out of the same or uniform filter media. In other examples, the filter elements are separate elements that couple to on another using conventional fasteners (e.g., nuts, bolts, adhesives, etc.). In still other embodiments, the filter elements can overlap one another to embed one of the first filter element 226 and the second filter element 228 in the other. This configuration for the filter elements can shorten the overall length of the filter device 200.

The filter device 200 can also include a mounting element that provides an interface to mount and secure the filter device 200, e.g., to the tubesheet 218 of air filter unit 206. The mounting element couples with tubesheet 218 to support the filter device 200 in the mounted configuration (e.g., the proper mounted configuration of FIG. 5). Examples of the mounting element 206 can secure to one or both of the first filter element 226 and the second filter element 228. However, in one or more constructions, the mounting element has limited, if any, affect on the flow of air that passes through the filter device 200.

One or more of the elements of the mounting element can be formed monolithically, as a single integrated structure. In other alternatives, the elements can comprise separate pieces that are assembled together using known fasteners and techniques. Construction of the mounting element can use metals, plastics, composites, and other materials compatible, e.g., with the filter media. Generally, suitable materials having mechanical properties to support the weight of the filter device 200 in the mounted configuration and/or to reduce the extent to which the filter device 200 will sag due to particulate build-up.

As used herein, an element or function recited in the singular and proceeded with the word "a" or "an" should be understood as not excluding plural said elements or functions, unless such exclusion is explicitly recited. Furthermore, references to "one embodiment" of the claimed invention should not be interpreted as excluding the existence of additional embodiments that also incorporate the recited features.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A filter device, comprising:

an elongated body with a longitudinal axis, the elongated body comprising a filter media;

a seal element disposed on a first end of the elongated body, the seal element comprising an annular ring circumscribing the longitudinal axis, the annular ring having an outer peripheral edge, a first annular portion, and a second annular portion, wherein the annular ring has a non-uniform profile that defines a material thickness, wherein the material thickness comprises a first material thickness at the outer peripheral edge of the annular ring in first annular portion and a second material thickness at the outer peripheral edge of the annular ring in the second annular portion, and wherein the first material thickness is greater than the second material thickness.

2. The filter device of claim 1, wherein the elongated body comprises a first filter element and a second filter element.

3. The filter device of claim 2, wherein the second filter element abuts a second end of the first filter element.

4. The filter device of claim 1, further comprising a support frame that fits inside of the elongated body.

5. The filter device of claim 4, wherein the elongated body comprises a groove that receives the support frame therein.

6. The filter device of claim 1, wherein the first annular portion is smaller than the second annular portion.

7. The filter device of claim 6, wherein the first annular portion covers 180° or less of the annular ring.

8. The filter device of claim 1, wherein the non-uniform profile defines a third material thickness in one of the first annular portion and the second annular portion, and wherein the third material thickness has a value between the first material thickness and the second material thickness.

9. A filter device, comprising:

a first filter element having a longitudinal axis, a first end, and a second end;

a second filter element abutting the second end of the first filter element; and a seal element disposed on the first end of the first filter element, the seal element comprising an annular ring circumscribing the longitudinal axis, the annular having an outer peripheral edge, a first annular portion, and a second annular portion, wherein the annular ring has a non-uniform profile that defines a material thickness, wherein the material thickness comprises a first material thickness at the outer peripheral edge of the annular ring in the first annular portion and a second material thickness at the outer peripheral edge of the annular ring in the second annular portion, and wherein the first material thickness is greater than the second material thickness.

10. The filter device of claim 9, further comprising a support frame that extends into the first filter element and the second filter element.

11. The filter device of claim 10, wherein at least one of the first filter element and the second filter element incorporates an orientation feature that receives the support frame therein.

12. The filter device of claim 9, wherein the seal element comprises a monolithic piece of compressible material.

13. The filter device of claim 9, wherein the seal element has a third material thickness with a value between the first material thickness and the second material thickness.

14. A power generating system, comprising:

an air filter unit comprising a tubesheet, a filter device with a longitudinal axis secured to the tubesheet, and a seal element disposed between the filter device and the tubesheet, the seal element comprising an annular ring circumscribing the longitudinal axis, the annular ring having an outer peripheral edge, a first annular portion, and a second annular portion, wherein the annular ring has a non-uniform profile that defines a material thickness for the seal element, wherein the material thickness comprises a first material thickness at the outer peripheral edge of the annular ring in the first annular portion and a second material thickness at the outer peripheral edge of the annular ring in the second annular portion, and wherein the first material thickness is greater than the second material thickness.

15. The power generating system of claim 14, wherein the filter device comprises a plurality of filter elements.

16. The power generating system of claim 15, wherein the plurality of filter elements comprise a first filter element and a second filter element that abuts an end of the first filter element.

17. The power generating system of claim 14, wherein the annular ring circumscribes an opening in the tubesheet.

18. The power generating system of claim 14, wherein the filter device comprises a support frame that aligns the filter device with an opening in the tubesheet, wherein the support frame comprises a mounting structure that extends through the opening and a cap structure with an end plate that seals an end of the filter device.

19. The power generating system of claim 18, wherein the filter element has an orientation feature that receives the support frame therein.

20. The filter device of claim 1, wherein the seal element exhibits the first material thickness across the entirety of the first annular portion and the second material thickness across the entirety of the second annular portion.

* * * * *